United States Patent [19]

Reichen et al.

[11] Patent Number: 4,769,978
[45] Date of Patent: Sep. 13, 1988

[54] LUBRICATION DISTRIBUTION SYSTEM FOR COTTON HARVESTER ROW UNITS

[75] Inventors: Ronald L. Reichen, Ottumwa; Bruce L. Hubbard, Ankeny, both of Iowa

[73] Assignee: Deere & Company, Moline, Ill.

[21] Appl. No.: 68,758

[22] Filed: Jun. 24, 1987

Related U.S. Application Data

[63] Continuation of Ser. No. 648,862, Sep. 7, 1984, abandoned.

[51] Int. Cl.<sup>4</sup> ............................................. A01D 46/08
[52] U.S. Cl. ........................................ 56/12.3; 56/28; 184/6; 184/108; 137/61
[58] Field of Search ................... 56/12.3, 28, 40–48

[56] References Cited

U.S. PATENT DOCUMENTS

| | | | |
|---|---|---|---|
| 2,089,523 | 8/1937 | Wupper | 184/7.3 |
| 2,467,722 | 4/1949 | Baker | 56/47 |
| 2,721,436 | 10/1955 | Hubbard | 56/47 |
| 2,723,520 | 11/1955 | Hubbard | 56/47 |
| 2,959,249 | 11/1960 | Gothberg et al. | 184/7.3 |
| 3,163,258 | 12/1964 | Thomas | 184/7.3 |

Primary Examiner—John Weiss

[57] ABSTRACT

A single constant displacement pump provides lubricant under pressure from an on-board grease reservoir through a two-position valve to a selected group of distribution manifolds mounted on a cotton harvester. Each manifold of the group is connected to a plurality of conduits which lead to harvester row unit lubrication points, such as on the picker bar cam tracks, picker drum drive gears and the lubricant cavity for each of the picker drums. A line from the picker drum cavity opens into and lubricates the drum thrust washer area. The quantity of lubricant to each point is determined primarily by relative conduit resistance, which in turn is controlled by conduit length and cross section so that individual metering valves or pumps for each lubrication point are obviated. Conduits of substantially equal length and cross section are provided for each group of points which are to receive equal amounts of lubricant. Two groups of manifolds are provided for each pair of row units and are charged, in turn, with lubricant under control of the selector valve.

23 Claims, 3 Drawing Sheets

LUBRICATION DISTRIBUTION SYSTEM FOR COTTON HARVESTER ROW UNITS

This application is a continuation of application Ser. No. 648,862, filed Sept. 7, 1984 abandoned.

BACKGROUND OF THE INVENTION

The present invention relates generally to cotton harvesters, and more specifically to a lubrication system for providing the proper amount of lubricant to a large plurality of lubrication points on the row units of a cotton picker.

A typical cotton picker includes two to four row harvesting units, each unit including a pair of upright picking drums located on either side of a row-receiving area. Each drum includes 12 to 16 vertical picker bars having an upper arm member with a cam follower riding in a cam track which orient picker spindles journalled in the bar one above the other and driven by a drive shaft extending through the bar. A drive gear arrangement located in the unit top transmits power from row unit input drive shafts to the drum and spindles.

The various drives, cams and spindles on each row unit must be lubricated frequently to prevent premature wear and failure. As many as 28 individual lubrication fittings are provided on the row unit of a typical cotton harvester, and each fitting usually must be located and provided with the proper amount of lubricant at least daily during the operating season. Extensive service time is therefore required. The fittings must be supplied with the proper amount of lubricant since too much lubricant in certain areas can contaminate the spindles and harvested cotton while too little can reduce the life of expensive components and increase downtime.

Various approaches have been devised to reduce the time and effort required to properly lubricate the row unit. A lubricating apparatus, such as shown in U.S. Pat. No. 3,144,096 of Lutwin C. Rotter, utilizes a separate lubricant metering pump for each drum to deliver a measured charge of grease to the picker bars of the drum. Such a system requires at least two metering pumps for each row unit and is relatively costly and complex, as are most lubrication systems which utilize special flow dividers or metering pumps.

BRIEF DESCRIPTION OF THE INVENTION

It is therefore an object of the present invention to provide an improved lubrication distribution system for a cotton harvester row unit. It is a further object to provide such a system which provides for accurate and quick lubrication of a large number of service locations.

It is a further object of the invention to provide an improved cotton harvester lubrication system which simultaneously and accurately distributes lubricant to numerous lubrication points on a plurality of row harvesting units. It is another object to provide such a system which requires just one lubricant pump.

It is another object of the invention to provide a lubrication distribution system for a cotton harvester which is less complex and costly than previous systems. It is yet another object to provide such a system which obviates expensive and complex flow dividers and multiple metering pumps.

It is still a further object to provide an improved cotton harvester lubrication distribution system which has centralized distribution and yet is relatively low in cost while achieving reliable and efficient distribution of lubricant to substantially all the critical locations in a plurality of row harvesting units, including picker bars, cams and drive gears. It is a further object to provide such a system which can selectively distribute lubricant to areas requiring a large volume of lubricant or alternatively to other areas which require substantially less lubricant and wherein proportioning of the lubricant in each of the areas is achieved primarily by conduit size.

In accordance with the above objects, a cotton harvester is equipped with an on-board grease reservoir in fluid communication with the input of a constant displacement gear pump drivingly connected through a pulley and electric clutch arrangement to the cotton harvester engine. When the electric clutch is activated with the engine running, grease under pressure is supplied to a two position, three way, operator controlled valve. The valve selectively controls one of two feed lines. The first feed line is connected to two manifolds, and each of the manifolds directs lubricant equally through four sized conduits. Each of the sized conduits feeds one of the four picker drums on a pair of adjacent row harvesting units. The sized conduits present an approximately equal resistance to lubricant flow from the respective manifold and are connected to the grease cavity at the lower end of the picker drum which distributes the lubricant to the picker bars. The second feed line directs lubricant to two other manifolds, each of which directs the proper amount of lubricant through sized conduits to at least five different locations on each of two adjacent row units. The relative amount of lubricant flowing from each of the manifolds to the areas to be lubricated is determined principally by the length and diameter of the conduit so that complex and expensive flow control valves or metering pumps are eliminated. The system provides for fast and convenient greasing of the picker bars and the cams and gears on each of the row units. The cams and gears on a four row cotton harvester can be lubricated in as little as ten seconds, and the high volume grease cavities can be supplied sufficient grease to lubricate all the picker bars of the eight drums on a four row harvester in as little as two and one-half minutes without requiring the operator to leave the seat of his cab.

The operator control valve includes an electric switch operably connected to the electric clutch so that when the operator pushes the valve to a first position, the clutch is activated and grease is supplied to the cams and gear for a short period of time. Thereafter, the operator releases the valve, which is biased toward a second position wherein the high capacity grease cavities on the picker drums are connected to the source of lubricant and the first switch is open so that the clutch is deactivated. A second switch is provided so that the operator can turn on the clutch to run the pump for a longer period of time to supply the cavities with the proper amount of lubricant. An additional line from each drum cavity is directed towards the drum thrust washer area adjacent the center sheet of the harvester so that this area can be lubricated without having to insert a grease gun into this hard to reach location. Therefore, a relatively simple and inexpensive and yet efficient and accurate lubrication system for a plurality of row units on a cotton harvester is provided. By using sized lines from the manifolds to proportion the lubricant, complicated and expensive flow dividers and metering pumps are eliminated.

These and other objects, features and advantages of the present invention will become apparent to those skilled in the art from the description which follows and from the drawings.

DESCRIPTION OF THE PREFERRED EMBODIMENT

Figure 1:
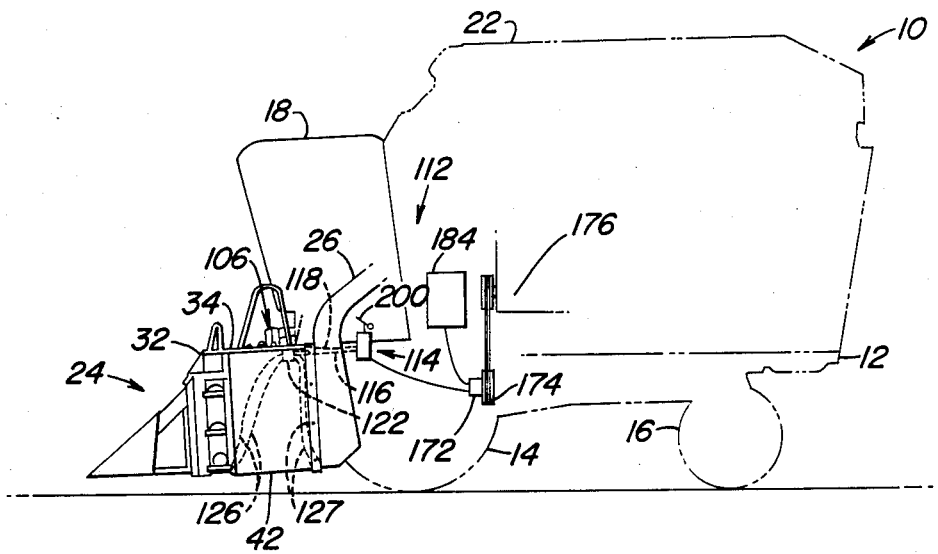
FIG. 1 is a side view of a cotton harvester with the lubrication distribution system of the present invention attached thereto.

Referring now to FIG. 1, therein is shown a cotton picker 10 having a main frame 12 carried by front traction wheels 14 and rear steering wheels 16. An operator station or cab 18 is supported on the frame 12, and a cotton receptacle 22 is located rearwardly of the cab 18.

A plurality of transversely spaced row units 24 are located on the forward end of the frame 12. Each of the row units 24 removes cotton from a row of cotton plants, and the cotton is directed rearwardly and upwardly to the receptacle 22 through a plurality of air ducts 26. The cotton harvester 10 is of conventional construction, such as the commercially available John Deere Model 9940 four row cotton harvester, and therefore will only be described in such detail to describe and orient the lubrication system, indicated generally at 28 in FIG. 3. For a more detailed description of the harvester reference may be had to U.S. Pat. Nos. 4,249,365; 4,282,702; and 3,219,145, which are assigned to the present assignee and which are incorporated herein by reference for the purpose of showing background material.

Each row unit 24 includes a housing 32 having a top plate 34 and a center sheet 36 (FIG. 2) between which is carried a picker drum and picker bar drive transmission assembly indicated generally at 38.

The row unit 24 also includes horizontal floor structure 42 supporting a pair of conventional upright picker drums 44. Each drum 44 is supported at its lower end on an upright drum support bearing assembly 46 which is centrally apertured at 48. A grease cavity 52 is provided at the bottom of the drum 44 in fluid communication with the aperture 48.

The top of the drum 44 is fixed for rotation with a drum drive shaft 56 projecting upwardly to the top plate 34. A plurality of picker bars 58 extend vertically from the bottom of the drum 44 to the top of the drum and are oscillatible about the vertical axis by a cam follower arm 62 which rides in a cam track 64 located on the bottom of the center sheet 36. Each picker bar 58 includes a vertical drive shaft 66 having driving pinions 68 in constant mesh with bevel pinion 72 on the inner ends of spindles 74. A pinion 76 fixed to the top of the drive shaft 66 meshes with a spindle drive gear 78 supported for rotation about the drum shaft 56. For further details of the picker bar, reference may be had to U.S. Pat. No. 4,463,543. A plurality of picker bar grease lines 82 are connected to the lower end of the picker drum 44 by elbows 84 positioned around the circumference of the drum. The upper ends of the lines 82 are connected by elbows 86 to the picker bars 58 so that grease may be provided to lubricate the spindles and pinions. A drum drive gear 92 is fixed to the drum drive shaft 56 and meshes with a unit idler slip clutch gear 94. The spindle drive gear 78 is fixed for rotation with a driven gear 98 which meshes with a drive gear 102 which also rotates the slip clutch gear 94. The drive gear 102 in turn is driven by a small gear which meshes therewith and is driven by the picking unit gear case drive assembly 106 (FIG. 1). A lubricated drum thrust washer 108 is provided on the drum drive shaft 56 to provide vertical support for the drive gears. It should be noted that in each row unit 24 there are two picker drums 44 so that in a four row harvester such as shown in FIG. 1, there are eight picker drums 44, each having a grease cavity 52 and associated picker drum and picker bar drive transmission structure 38 which, along with the associated cam tracks 64, require daily greasing during operation.

The lubrication system 28 includes a source of pressurized lubricant or grease 112 (FIG. 3) located on the cotton picker 10 and selectively connected through a two position, operator-controlled valve 114 for selectively supplying lubricant under pressure to one of two feed lines 116 or 118. The feed line 116 is connected to a pair of generally identical bar distribution manifolds 122 and 124 which are fixed between the left-hand pair of row units 24 and right-hand pair of row units 24, respectively, adjacent the corresponding top plates 34. A pair of sized conduits 126 extends from the manifold 122 to the cavities 52 on the front drums of the left-hand pair of row units on the harvester. A pair of sized conduits 127 extends from the manifold 122 to the cavities 52 on the rear drums of the units. A generally identical system is provided for the right-hand pair of row units 24 and includes a pair of sized conduits 128 extending from the manifold 124 to the forward drum cavities 52 and a pair of sized conduits 129 extending from the manifold 124 to the rearward drum cavities 52. The lines 126–129 are generally of the same length and cross section so as to provide a substantially equal resistance to grease flow therethrough from line to line so that as grease is supplied under pressure to the manifold 122 and 124, an equal amount of the grease is distributed to each of the eight picker drum cavities 52.

The second feed line 118 is connected to a pair of top plate manifolds 132 and 134 associated with the left-hand pair and right-hand pair, respectively, of the row units 24. A pair of sized conduits 136 is connected to the manifold 132 and extends to the cam tracks 64 associated with the front drums of the two left-hand row units 24. A second pair of sized conduits 137 extends from the manifold 132 to the cam tracks 64 associated with the two rear drums on the left-hand pair of row units 24. Three pairs of sized conduits 138, 139 and 140 extend between the manifold 132 and three locations adjacent the drive gears of the picker drum and picker bar drive transmission assembly 38. A substantially identical arrangement is provided from the manifold 134 and includes pairs of sized conduits 146 and 147 connected between the manifold 134 and the respective cam tracks 64 on the right-hand pair of units 24. In the preferred embodiment the cam track lines 136, 137 and 146, 147 are all of approximately the same length and cross section so as to provide a substantially equal resistance to lubricant flow therethrough so that all of the cam tracks 64 receive substantially an equal amount of lubricant. Likewise, the gear conduits 138, 139, 140 and 148, 149, 150 are substantially of equal length and cross section to provide equal distribution of the lubricant between twelve different gear locations on the transmission assemblies 38 of the four row units 24. Since the cam tracks 64 require a proportionately larger amount of lubricant per track than each of the lubrication points associated with the transmission assemblies 38, the lines 136, 137 (146, 147) are sized to have substantially less resistance to grease flow therethrough than the corresponding lines 138, 139, 140 (148, 149, 150). The feed lines 116 and 118, which are connected by t-connectors 162 and 164 to branch lines 166 and 168, respectively, are relatively large capacity lines to prevent substantial pressure drop from the operator control valve 114 to the respective t-connector. Likewise the branch lines 166 are generally large capacity and are of equal length so that the pressure of the lubricant at the manifolds 122 and 124 is substantially equal and proper distribution to the cavities 52 is accomplished primarily by the equal resistance through the lines 126–129. In a similar manner, the branch lines 168 are equal length, high-capacity lines so that the lubricant pressure at manifold 132 and 134 are kept substantially identical. The sized lines 136–140 and 146–150 associated with the respective manifolds 132 and 134 provide proper distribution to the cam track 64 and the lubrication points on the transmission assemblies 38.

Figure 3:
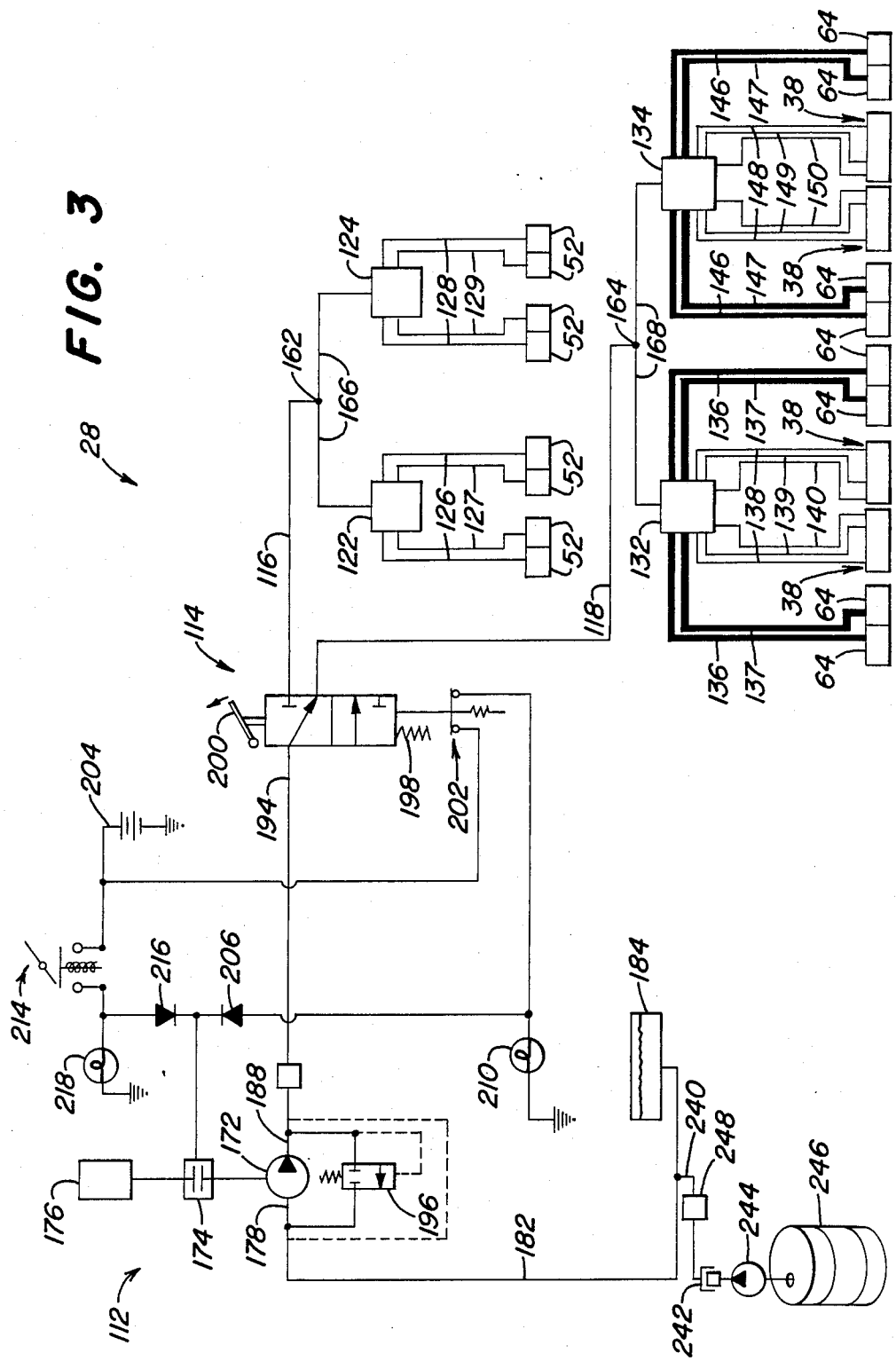
FIG. 3 is a schematic representation of the lubrication distribution system of the present invention utilized with a four row cotton harvester.

The pressurized source of lubricant 112 includes a constant displacement gear pump 172 mounted on the frame 12 adjacent the harvester engine and driven by an electrically operated clutch sheave 174 by a conventional belt and pulley arrangement driven by harvester engine 176. The gear pump 172 includes an input port 178 connected through a supply line 182 to a lubricant reservoir 184 mounted above the pump 172 on the frame 12. The pump 172 includes an output port 188 connected through a conventional grease filter or strainer 192 to the input port 194 of the operator control valve 114. The output port 188 is also connected through a pressure relief valve 196 to the input port 178 so that if the pressure at the output of the pump exceeds a preselect value, grease will be recirculated from the output 188 to the input 178. In cold grease conditions, the relief valve 196 limits the maximum pressure at the pump output while the circulation of the lubricant with the bypass in effect provides a heating effect to improve lubricant flow in cold weather. The operator control valve 114 has a first position, shown in FIG. 3, wherein the input port 194 is opened to the feed line 118 so that lubricant under pressure can flow to lubricate the cams 64 and lubrication points on the transmission assembly 38. The valve 114 has a second position wherein the input port 194 is open to the feed line 116 to provide grease to the cavities 52. The valve 114 includes a biasing element 198 which normally maintains the valve 114 in the second position, that is, with the input port 194 in communication with the high capacity feed line 116 associated with the drum cavities 52 which require a substantially greater amount of lubricant than the cam track 64 and transmission assemblies 38. The valve 114 includes a handle-operated plunger assembly 200 which extends upwardly into the cab besides the operator. A normally open contact switch 202 is connected to the valve 114 so that when the operator depresses the lever 200 against the bias of the element 198, the switch 202 closes as shown in FIG. 3. The switch is connected between the positive input of the vehicle battery 204 and a diode 206 which in turn is connected to the electric clutch sheave 174. When the operator depresses the lever 200, the switch 202 closes to operate the clutch 174 so that the engine 176 drives the pump 172 to supply grease under pressure to the line 118. An indicator light 210 is illuminated to remind the operator that the cams 64 and transmission assembly 38 are being lubricated. After a short period of time, which during warm weather conditions is on the order of only ten seconds, the operator releases the lever 200 so that the valve 114 moves to the second position and the switch 202 opens to disconnect the drive from the electric clutch 174. The output of the pump 172 then is connected through the valve 114 to the feed line 116. An operator controlled electric switch 214 connected between the battery 204 and the electric clutch 174 via a diode 216 may be closed so that the engine 176 drives the pump 172 through the clutch 174 to provide grease under pressure to the line 116. A second indicator light 218 connected between the switch 214 and the diode 216 is illuminated to indicate to the operator that the picker drums are being lubricated. In warm weather conditions, the pump 172 is driven for approximately two and one-half minutes when the control valve 114 is in the second position to supply the feed line 116.

Figure 2:
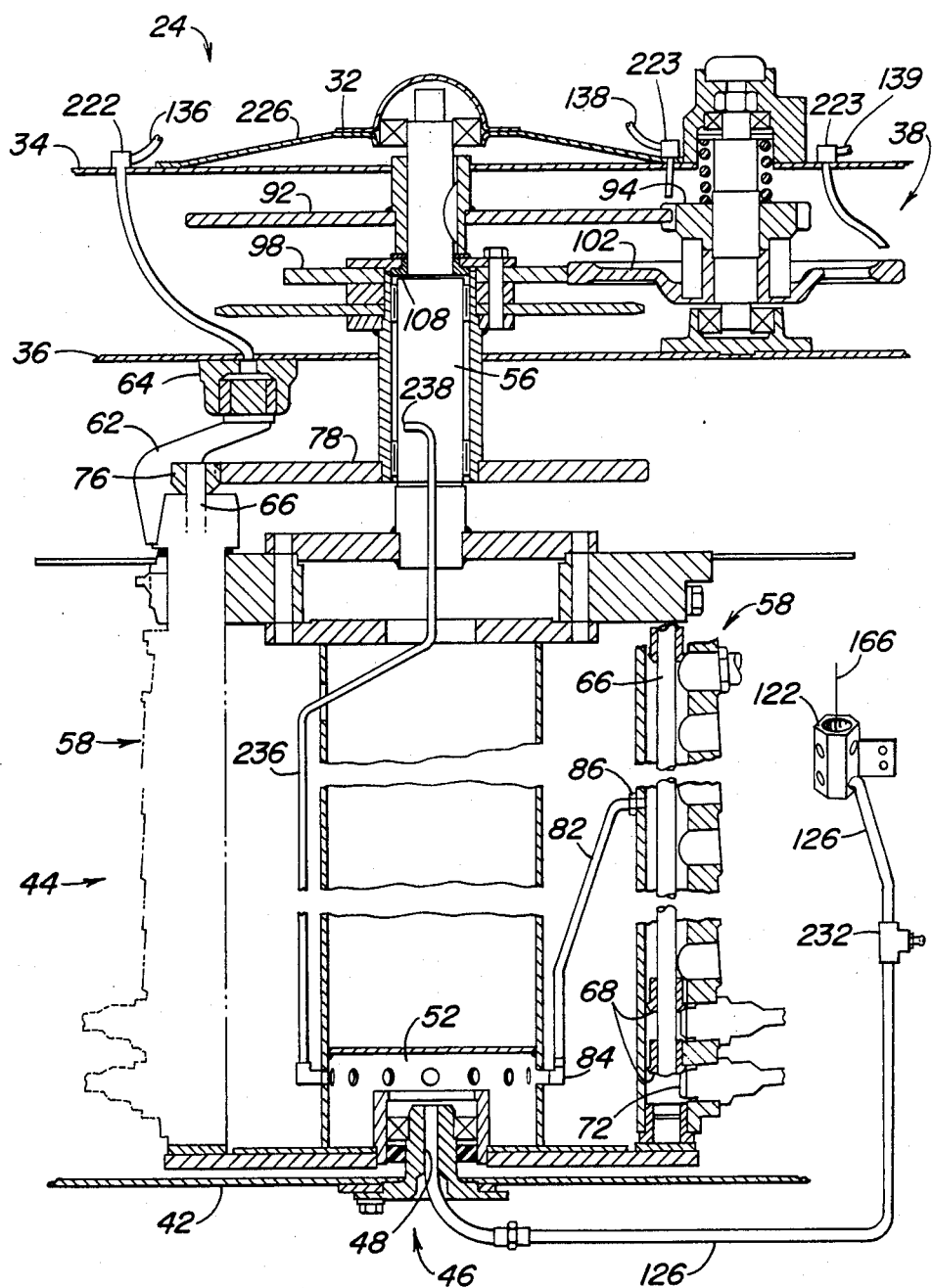
FIG. 2 is a view of a portion of a row harvesting unit showing various locations which are lubricated by the system of the present invention.

Referring now to FIG. 2, one of the sized conduits 136 for the cam tracks is shown extending through the top plate 34 and opening through the center sheet 36 to a location within the cam track 64. A ninety-degree elbow or other suitable means is utilized to extend the conduit 136 through the top plate 34. It should be noted here that since the relative volumes of lubricant passing through the numerous sized conduits is determined by the resistance in the conduits, care must be taken to assure that the conduits and the various conventional connectors associated therewith are not bent or crimped so that proper distribution ratios are maintained. The remaining sized cam track conduits 137 and 146, 147 are connected to the row unit in similar manner and so will not be discussed in further detail here. The conduit 138 extends through the top plate adjacent a turtle cover 226 and opens onto the mesh between the gears 92 and 94. Similarly, the line 140 opens onto the corresponding mesh between gears on the adjacent drum of the row unit. The conduit 139 opens onto the mesh between the small drive gear (not shown) of the picking unit gear case drive assembly 106 and the drive gear 102. The location of the sized conduits 148–150 are generally identical to that described above for 138–140 and therefore will not be shown in detail. It is to be understood that various areas of lubrication in the row unit may be lubricated according to the principles of the present invention, and the above lubrication areas are given by way of example only. Also, by way of example, the pump 172 typically supplies a lubricant pressure on the order of 250–300 pounds to the control valve 114. The feed lines 116, 118 and 166, 168 are sufficiently large, preferably on the order of approximately one-half inch outer diameter, so that there is relatively little pressure drop between the control valve 114 and the manifolds which are selectively being supplied with lubricant. The sized bar distribution conduits 126–129 are each on the order of eleven to twelve feet in length, fabricated from one quarter inch outer diameter high pressure plastic tubing having an inner diameter on the order of 0.15 inch. The sized cam track conduits 136, 137 and 146, 147 are preferably each approximately fourteen and one-half inches long and have an outer diameter on the order of five-sixteenths of an inch and an inner diameter of about 0.182 inch. The gear lubrication lines 138–140 and 148–150 are preferably each about twenty-nine inches in length and have an outer diameter of approximately three-sixteenths of an inch and an inner diameter of about 0.107 inch so that substantially less grease will flow through each of the gear lubricating lines than what flows through the cam track lubricating lines. A greasing tee 232 may be connected in each of the bar distribution conduits 126–129 and positioned near the front of the row units 24 so that the bars can be greased manually if desired. An additional line 236 is connected to the grease cavity 52 and opens at 238 (FIG. 2) to provide lubrication for the drum thrust washer area 108.

To charge the grease reservoir 184, a fill line 240 which is connected to the supply line 182 is attached by means of a releasable connector 242 to the output of a hydraulically operated grease pump 244 which has an input extending into a supply barrel 246 filled with lubricant. The pump 244 is operated to supply lubricant through the line 240 and through a strainer 248 into the reservoir 184 via the line 182. The releasable connector 242 is located at a convenient location on the side of the frame 12.

Having described the preferred embodiment, it will be apparent that modifications can be made without departing from the scope of the invention as defined in the accompanying claims.

We claim:

1. In a mobile cotton harvester having a plurality of lubrication-receiving areas, a lubrication distribution system comprising:
    a lubricant reservoir located on the harvester;
    a lubricant pump having an input connected to the reservoir and an output for providing lubricant under pressure;
    means for distributing preselected amounts of the pressurized lubricant to the respective lubrication areas, said means comprising at least one manifold having an input connected to the pump output, a plurality of sized conduits including input ends connected to the manifold and output ends opening into the lubrication-receiving areas, said sized conduits connected in parallel with each other and each conduit presenting a preselected resistance to lubricant flow therethrough dependent on conduit size, whereby the relative amount of lubricant flowing from the manifold to each lubrication-receiving area is substantially determined by the preselected resistance of the corresponding sized conduit.

2. The invention as set forth in claim 1 wherein the means for distributing includes two manifolds each having an input, said means further comprising an input tubing connected between each manifold input and the pump output.

3. The invention as set forth in claim 1 wherein at least two of the sized conduits comprise tubing of approximately equal length and of equal cross section to provide equal amounts of lubricant to the corresponding lubrication-receiving areas.

4. The invention as set forth in claim 2 further comprising an operable selector valve means having an input port connected to the pump output and two output ports, each output port connected to a one of the input ends of the tubings.

5. The invention as set forth in claim 4 including first switch means operably connected to the selector valve means, and wherein the lubricant pump includes electrically operated drive transmission means connected to the switch means and responsive to operation of the selector valve.

6. The invention as set forth in claim 4 wherein the valve means is operable to supply at least ten times the volume of lubricant to one of the input tubings as compared with the other of said input tubings.

7. The invention as set forth in claim 3 further including at least a third sized conduit connected between the manifold and a corresponding lubrication area, the conduit having a cross section and length, at least one of which differs substantially from that of the two first-mentioned conduits to provide a different resistance to lubricant flow than, and therefore controlling the relative amount of lubricant delivered with respect to, said two first-mentioned conduits.

8. The invention as set forth in claim 5 wherein the valve means includes means for normally biasing the valve toward a first position for supplying one of the input tubings with a substantially greater volume of lubricant than the other tubing, said first switch means responsive to movement of the valve against the bias toward a second position wherein the other of said tubings is connected to the pump output.

9. The invention as set forth in claim 8 further comprising second switch means operably connected to the drive transmission means for operating the pump when the valve means is in the second position.

10. The invention as set forth in claim 9 including indicator means for providing an indication of the valve position.

11. In a mobile cotton harvester having a plurality of transversely spaced row units, each unit including at least two upright picker drums, each drum having a plurality of gear-driven spindles journalled in upright columns on picker bars and a cam track for orienting the bars about an upright axis, a drive transmission for driving the drums, and a lubrication cavity located at the lower end of the drum, said cavity having an input for receiving lubricant and a plurality of flexible tubes leading to the bars for providing lubricant to the bars from the cavity, each lubrication cavity adapted to receive a like amount of lubrication from a source of lubricant, a lubrication distribution system comprising:
    a source of pressurized lubricant located on the harvester;
    a manifold connected to the source of lubricant and receiving lubricant under pressure therefrom;
    a plurality of first sized conduits, each conduit having an input end connected to and in fluid communication with the manifold and an output end connected to a different one of the cavities, each conduit having a preselected inner cross section and length, said sized conduits each presenting a resistance to lubricant flow therethrough from the manifold to the corresponding cavity dependent on said cross section and length, and wherein said cross section and length for each conduit is selected to provide substantially equal resistance to lubricant flow therethrough so that each container receives substantially an equal amount of lubricant.

12. The invention as set forth in claim 11 wherein the harvester includes at least two row units with four picker drums, and said plurality of sized conduits comprises four conduits.

13. The invention as set forth in claim 11 further comprising a second manifold, means connecting the second manifold to the source of lubricant, a plurality of second sized conduits connected between the second manifold and the cam tracks, a plurality of third sized conduits connected between the second manifold and the drive transmission, said second and third conduits each presenting a resistance to lubricant flow therethrough to the corresponding cam track and corresponding drive transmission, respectively, dependent on the cross section and size of said conduit to control the relative amounts of lubricant to said track and transmission.

14. The invention as set forth in claim 13 wherein the second conduits are of equal length and have a first preselected cross section and the third conduits have a cross section substantially smaller than the first cross section.

15. The invention as set forth in claim 13 wherein the means connecting the second manifold to the source of lubricant includes a two-position valve and said source of pressurized lubricant includes a constant displacement pump having an input and an output, wherein when said valve is in a first position, the pump output is connected to the second manifold, and when the valve is in a second position, the pump is connected to the first manifold.

16. The invention as set forth in claim 15 including means normally biasing the valve to the second position.

17. The invention as set forth in claim 15 further including a pressure relief valve connected between the pump input and output.

18. In a mobile cotton harvester having a plurality of transversely spaced row units, each unit including at least two rotatable upright picker drums, each drum having a plurality of gear-driven spindles journalled in upright columms on picker bars and a cam track for orienting the bars about an upright axis, a drive transmission for driving the drums, and a lubrication cavity located at the lower end of the drum and rotatable therewith, said cavity having an input for receiving lubricant and a plurality of flexible tubes leading to the bars for providing lubricant to the bars from the cavity, a lubrication distribution system comprising:
  a source of pressurized lubricant located on the harvester;
  a plurality of conduits, each conduit having an input end connected to and in fluid communication with the source of lubricant and an ouput end connected to a different one of the cavities, each conduit including means for providing a controlled lubricant flow therethrough from the source to the corresponding cavity so that each container receives a preselected amount of lubricant, and conduit means connected between each lubrication cavity and the corresponding upper end of the drum adjacent the drive transmission and above the picker bars for supplying lubricant from the cavity to a portion of said transmission.

19. For a mobile crop harvester having a number of lubrication areas, each area requiring a predetermined amount of lubricant, a lubrication distribution system adapted for mounting on the harvester, said system comprising:
  a source of lubricant under pressure;
  a plurality of manifolds connected to the source of lubricant; and
  a plurality of sized conduits, each connected at one end to one of the manifolds, said conduit plurality equal to the number of lubrication areas, the conduits having output ends adapted for routing adjacent the respective lubrication areas, wherein said sized conduits each have a resistance to lubricant flow therethrough substantial as compared with the resistance of the manifolds, said resistance determined primarily by the cross section and length of the conduit, whereby the relative amount of lubricant delivered to each of the ends of the conduits for a preselected manifold is determined by the relative resistance of each of the conduits connected to said preselected manifold.

20. The invention as set forth in claim 19 wherein the plurality of manifolds comprises two manifolds, said distribution system further comprising a control valve connected between the source of lubricant and manifolds and operable to connect said source in turn to each of the two manifolds, where in one of said manifolds is connected to a plurality of the conduits adapted for routing to lubrication areas requiring substantially more lubricant than the areas associated with the conduits connected to the other of said manifolds.

21. The invention as set forth in claim 18 wherein the drive transmission includes a drum drive shaft and a drive gear thrust washer, and the conduit means opens adjacent the drive shaft and thrust washer.

22. The invention as set forth in claim 21 wherein the drum drive shaft is hollow and the conduit means extends into the drive shaft.

23. In a mobile cotton harvester having a row unit including at least two rotatable upright picker drums, each drum having a plurality of gear-driven spindles journalled in upright columns on picker bars in a cam track for orienting the bars about an upright axis, a drive transmission for driving the drums, wherein the drum includes a hollow drum shaft and a thrust washer for providing vertical support for at least a portion of the drive transmission, a lubrication cavity located at the lower end of the drum and rotatable therewith, said cavity having an input for receiving lubricant and a plurality of outputs with conduit means for connecting the outputs to the bars for providing lubricant to the bars from the cavity, means for lubricating the thrust washer area comprising:
  a conduit connected to one of the cavity outputs for receiving lubricant from the cavity;
  said conduit including an upright portion extending upwardly from the cavity; and
  a centrally located portion extending upwardly from the upright portion and upwardly through the hollow drum shaft to an output area located adjacent the thrust washer.

* * * * *